(12) United States Patent
Blase

(10) Patent No.: US 6,270,258 B1
(45) Date of Patent: Aug. 7, 2001

(54) GUIDE TROUGH FOR ENERGY MANAGEMENT CHAINS

(75) Inventor: Gunter Blase, Bergisch Gladbach (DE)

(73) Assignee: Igus SpritzguBteile fur die Industrie GmbH (DE)

( * ) Notice: Subject to any disclaimer, the term of this patent is extended or adjusted under 35 U.S.C. 154(b) by 0 days.

(21) Appl. No.: 09/194,838

(22) PCT Filed: Jun. 9, 1997

(86) PCT No.: PCT/DE97/01167

§ 371 Date: Aug. 27, 1999

§ 102(e) Date: Aug. 27, 1999

(87) PCT Pub. No.: WO97/47899

PCT Pub. Date: Dec. 18, 1997

(30) Foreign Application Priority Data

Jun. 7, 1996 (DE) .......................................... 296 10 067 U

(51) Int. Cl.⁷ ...................................................... F16G 13/16
(52) U.S. Cl. ............................ 384/26; 59/78.1; 191/12 C; 248/49
(58) Field of Search .................................. 384/22, 26, 41, 384/42; 59/78.1; 174/99 E; 248/49; 191/12 C

(56) References Cited

U.S. PATENT DOCUMENTS

| 3,157,376 | * | 11/1964 | Merker et al. | ............................ | 59/78.1 |
| 5,332,865 | * | 7/1994 | Jensen | ................................ | 174/99 E |
| 5,549,374 | * | 8/1996 | Krivec | ................................ | 384/42 X |
| 5,649,415 | * | 7/1997 | Pea | ........................................ | 59/78.1 |

FOREIGN PATENT DOCUMENTS

| 9405115 | 6/1995 | (DE) . |
| 19512105 | 1/1996 | (DE) . |

* cited by examiner

*Primary Examiner*—Thomas R. Hannon
(74) *Attorney, Agent, or Firm*—Reising, Ethington, Barnes, Kisselle, Learman & McCulloch, P.C.

(57) ABSTRACT

A guide trough for energy management chains which has parallel, oblong side sections, and one energy management chain can be positioned therebetween in the longitudinal direction. Fittings such as slide rails are secured to the inside of the side sections. The side sections (1) have at least one cross-member 2 which points obliquely up and protrudes into the guide trough. A holding member (6) also protruding obliquely on a fitting (3, 4, 5) can be mounted on a cross-member and, assisted by the cross-member 2 fixes the fitting (3, 4, 5) to the side section (1).

30 Claims, 1 Drawing Sheet

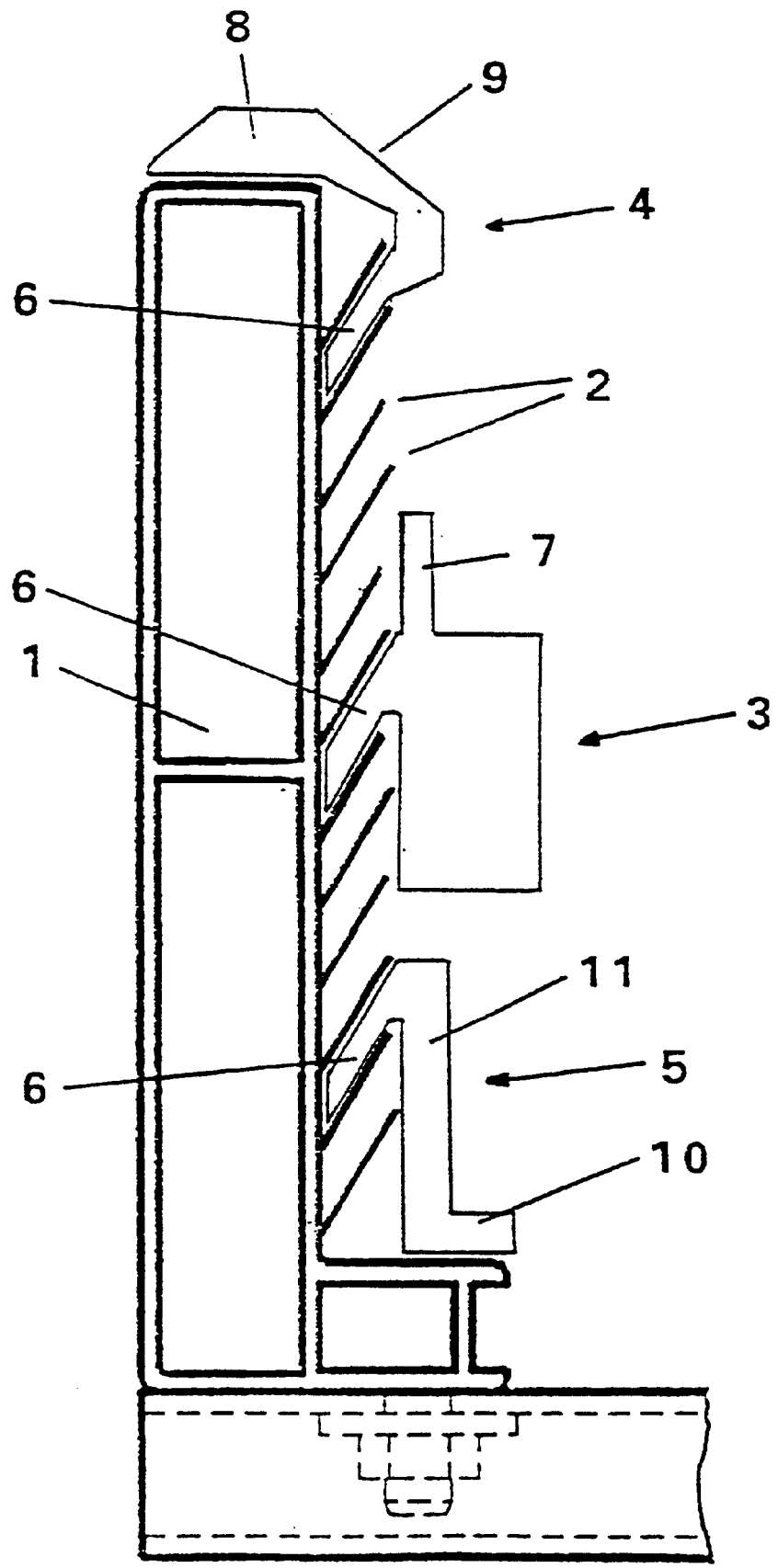

GUIDE TROUGH FOR ENERGY MANAGEMENT CHAINS

FIELD OF THE INVENTION

The invention relates to a guide trough for energy management chains with parallel, oblong side sections, between which an energy management chain can be positioned in longitudinal direction, where fittings, in particular slide rails with a support surface for the energy management chain, can be secured to the inside of the side sections.

BACKGROUND OF THE INVENTION

Energy management chains of this kind are known, for example, from DE-PS 195 12 105, where undercut recesses are provided on the inside of the side sections, into which a hook-shaped projection located laterally on the slide rail can be introduced and secured to the side element without further fastening devices. In this way, little time or effort is required to secure the slide rails to the side elements and detach them again. However, when using slide rails of this kind provided with a hook, it has proven to be a disadvantage that, owing to the relatively great length of the slide rails, it takes a certain degree of dexterity to introduce the hook into the recesses in the side sections. Moreover, production of hook-shaped projections on the slide rails and of corresponding recesses on the side sections involves a comparatively high manufacturing effort.

SUMMARY OF THE INVENTION

The invention is based on the task of creating a guide trough with fittings, in particular slide rails, in which the fittings can be secured to the side sections in a particularly simple and reliable manner and in which the fittings are of simple design.

According to the invention, the task is solved in that the side sections display at least one support bevel which points obliquely up and protrudes into the guide trough and on which a holding member, also protruding obliquely on a fitting, can be positioned and, assisted by the support bevel, fixes the fitting in the side sections. This permits a simple design of the holding members and the side sections and eliminates the need for comparatively complicated production of hook-shaped projections and recesses corresponding to them. In order to secure the fittings to the side sections, their holding members need simply be positioned on the support bevels of the side sections, as a result of which there is no need for complicated introduction of hook-shaped projections into corresponding recesses. It is also possible to first position one end of the holding members on the support bevels, this facilitating fitting. It has been found that simply the dead weight of the loosely positioned fittings, in conjunction with the angling of the support areas of the side sections, permits sufficiently stable securing of the fittings on the side sections.

The support bevels are advantageously designed as cross-members extending over the entire length of the side sections.

In order to be able to secure the fittings on the side sections at different heights and/or in order to be able to mount several different fittings on the side sections at once, it is advantageous to provide each side section with several support bevels, arranged at intervals one above the other.

It has proven to be particularly advantageous if the holding members of the fittings, which project obliquely down, are fixed by an interference fit between support bevels located above or below each other on the side sections. This permits simple and, at the same time, fixed, i.e. non-displaceable, securing of the fittings to the side sections. This avoids rattling of the fittings, for example of slide rails during rapid movement of the energy management chain located in the guide trough, such as always occurs on slide rails provided with hook-shaped projections owing to the play of the hook-shaped projections in the corresponding recesses which has to be allowed. The noise generated during rapid movement of the energy management chain is greatly reduced in this way. Moreover, in the case of slide rails secured by means of hook-shaped projections, there is also the possibility of unintentional detachment of the slide rails from the side sections if the recesses located on the side sections are designed to be relatively large in order to facilitate introduction of the hook-shaped projections, or if the hook-shaped projections are of relatively small dimensions. This can be reliably avoided by fixing the fittings by means of an interference fit. The fittings can, for example, be detached from the side sections by prising them out with a tool, or by applying light blows to their underside.

It has proven particularly advantageous if support bevels of planar design have an upward slope of more than 45°, preferably between 50° and 70°. This slope has proven to be favourable, regardless of whether the holding members of the fittings are fixed between the support bevels by means of an interference fit or simply positioned loosely on the support bevels.

In order to obtain particularly dimensionally stable side sections and to reduce the noise generated during movement of the energy management chain, the side sections can be designed as hollow sections.

The fittings for the guide troughs according to the invention display a holding member, which protrudes obliquely down, is preferably straight and can be brought into contact with a support bevel of the side section.

If the fittings are designed as slide rails, these can display a projection which extends vertically upwards from the support surface for the energy management chain and can be positioned between the side section and the energy management chain. The projection maintains a distance between the side section and the energy management chain, thus preventing damage to the side section and/or the support bevels located on it, or to the energy management chain. This is particularly important in the case of rapid movement of the energy management chain. If the slide rails are provided with this kind of projection extending vertically upwards, the securing of the slide rails by means of projections extending in a straight line down from them is particularly advantageous, as tilting of the slide rails, such as is necessary for securing by means of hook-shaped projections, is made considerably more difficult by the vertical projections.

It has furthermore proven advantageous to provide caps as fittings, these being mounted on the side sections and displaying an area which at least partially covers the top side of the side sections and a run-in bevel which slopes down into the guide trough and facilitates insertion of the energy management chain into the guide trough. The area of the caps covering the top side of the side sections simultaneously protects the support bevels projecting into the guide trough, and the cross-members for the holding members of the fittings, against effects of the energy management chain. It is advantageous for the run-in bevel to follow on directly from the area covering the top side of the side section.

Moreover, it has proven particularly advantageous to provide a wall guard for the lower strand of the energy management chain as a further fitting, this displaying a vertical leg which can be positioned between the side section and the energy management chain and guarantees that a gap is maintained between the lower strand and the support bevels of the side sections, and a horizontal leg, on which the lower strand can be positioned. At the same time, the horizontal leg can advantageously be positioned on the substructure to which the side sections are secured. By using a wall guard of this kind, both the side sections and the support bevels for the lower strand can be protected against wear in the region of the lower strand. At the same time, selection of an appropriate material for the wall guard brings about a further reduction in noise levels during rapid movement of the energy management chain.

Given an appropriate design of the guide trough according to the invention, and of the securing devices of the fittings, a host of fittings with different functions can be secured on the side sections, as the fittings have to be moved in an essentially unchanging direction towards the side sections in order to bring the holding members into contact with the support bevels of the side sections. This eliminates the need for tilting of the fittings in the longitudinal direction of the guide trough, such as is necessary when securing with hook-shaped projections and during which projections on the fittings interfere. Moreover, the support bevels projecting from the side sections into the guide trough eliminate the need for recesses in the side sections, which demand a relatively complex design of the side sections or reduce the wall thickness of the side sections in this area, and thus also their stability and noise-damping properties.

An example of the invention is explained below and described on the basis of the drawing.

DESCRIPTION OF THE DRAWINGS

The single figure of the drawing is a cross-sectional view of one side of a guide trough with support bevels and fittings according to the invention.

BEST MODE FOR CARRYING OUT THE INVENTION

Referring now to the drawing, there is shown an illustrative embodiment of the invention in a guide trough for energy management chains which has parallel, oblong side sections adapted to receive an energy management chain therebetween extending in the longitudinal direction. Fittings, such as slide rails, for support of the energy management chain are secured to the inside of the side sections by means of cross members and holding members as will be described. It will be appreciated, as the description proceeds, that the invention will be useful in a variety of applications and may be realized in a variety of embodiments.

The FIGURE shows one side section 1 of a guide trough consisting of side sections arranged parallel to each other. A large number of evenly spaced support bevels or cross-members 2 are located on the inside of side sections 1, protruding into the guide trough and extending over the entire length of side sections 1. Cross-members 2 can, for example, be spaced 6 mm apart, although the spacing can be larger or smaller, particularly depending on the weight of the energy management chain or the speed of travel. Starting from side section 1, cross-members 2 point obliquely up towards the inside of the guide trough and have a slope of approx. 60°.

Side section 1 is designed as a hollow aluminium section, which is manufactured in one piece, along with the cross-members, by the extrusion process.

Secured on the sides of side section 1 facing the inside of the guide trough are fittings designed as slide rail 3, cap 4 or wall guard 5. The fittings are provided with holding members 6, which project obliquely down and extend over the entire length of the fittings, although it is also possible for several holding members to be located on a single fitting at intervals. The angle of holding members 6 corresponds to the angle of cross-members 2, the thickness of holding members 6 being dimensioned in such a way that they can be fixed by an interference fit between cross-members 2 arranged at different heights.

Slide rails 3 display strip-like projections 7, which extend vertically upwards from the support surface 12 for the energy management chain and which are located between the energy management chain and cross-members 2, secured to side sections 1, when an energy management chain is in place. Projections 7 extend over the entire length of slide rails 3, although there can also be several projections at a distance from each other. Projections 7 protect cross-members 2 against effects of the energy management chain which can occur if the energy management chain deviates from a straight path. Projections 7 thus essentially serve as scuff rails.

Additionally secured on side sections 1 are caps 4, which display a cap area 8 covering the top side 13 of the side sections 1, this being followed by a run-in bevel 9 pointing towards the inside of the guide trough, which facilitates the insertion of the energy management chain into the guide trough. Furthermore, cap 4 prevents cross-members 2 located in the upper area of side section 1 from being damaged during insertion of the energy management chain into the guide through.

Another fitting secured to side section 1 is a wall guard 5, which displays a horizontal leg 10 as a support for the lower strand and a vertical leg 11, which serves to maintain a gap between the energy management chain and cross-members 2 and also serves as a scuff rail, like projection 7 of slide rails 3. In this context, horizontal leg 10 is supported by the horizontal leg of side section 1 and makes full contact with it.

Owing to the parallel arrangement of cross-members 2 in relation to each other, and the straight design of holding members 6, the latter can be secured between cross-members 2 by simply inserting them, in which context the direction of insertion can be both vertical to the inner walls of the side sections and, less advantageously, in the longitudinal direction of the side sections, or holding members 6 can be positioned on one of the cross-members 2.

ALTERNATIVE EMBODIMENTS

The support bevels can, for example, be designed with concave or convex curvature, although it is advantageous for the support bevels to be of planar design, this facilitating the securing of the fittings. It is advantageous to provide largearea support of the holding members of the fittings by the support bevels, although support in partial areas is also sufficient.

The cap can extend over the entire top side of the side sections and, for example, be provided with a snap-in strip which can be secured to the outside of the guide trough so that the cover can be snap-fitted onto the side section.

The aforementioned configurations of the fittings as slide rails, caps and wall guards are merely examples, and other fittings can be secured inside the guide trough by means of holding members which can be positioned on the support bevels of the side sections. The fittings can be inserted individually and independently of each other.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. In a guide trough for use with energy management chains of the type having parallel, oblong side sections for receiving an energy management chain disposed therein, and extending longitudinally thereof, said guide trough having fittings with a surface for coacting with the energy management chain, said fittings being secured to the inside of the side sections, the improvement wherein:

each of the side sections have at least one cross-member which extends obliquely upwardly of the guide trough and protrudes into the guide trough, a fitting having a holding mailer which extends obliquely downwardly of said guide trough, said holding Giber being removably disposed in engagement with said at least one cross-member for supporting the fitting on the side section.

2. A guide trough as defined in claim 1 wherein:
said fitting is a slide rail having a support surface for the energy management chain and having a projection which extends vertically upwards from the support surface and located adjacent the side section for engagement by the energy management chain.

3. A guide trough as defined in claim 1 wherein:
said fitting is a cap having a member which at least partially covers the top side of the side section and is joined with a run-in bevel which slope downwardly into the guide trough.

4. A guide trough as defined in claim 1 wherein:
the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

5. A guide trough as defined in claim 1 wherein;
said at least one cross-member extends over the entire length of the side sections.

6. A guide trough as defined in claim 5 wherein:
said fitting has a holding member which protrudes obliquely downward from the fitting and is disposed in engagement with a cross-member.

7. A guide trough as defined in claim 5 wherein:
said fitting is a slide rail having a support surface for the energy management chain and having a projection which extends vertically upwards from the support surface and located adjacent the side section for engagement by the energy management chain.

8. A guide trough as defined in claim 5 wherein:
said fitting is a cap having a member which at least partially covers the top side of the side section and is joined with a run-in bevel which slopes downwardly into the guide trough.

9. A guide trough as defined in claim 5 wherein:
the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

10. A guide trough as defined in claim 1 or 5 wherein:
each side section is provided with several support bevels which are spaced from each other, one above the other.

11. A guide trough as defined in claim 10 wherein:
said fitting has a holding member which protrudes obliquely downward from the fitting and is disposed in engagement with a cross-member.

12. A guide trough as defined in claim 10 wherein:
said fitting is a slide rail having a support surface for the energy management chain and having a projection which extends vertically upwards from the support surface and located adjacent the side section for engagement by the energy management chain.

13. A guide trough as defined in claim 10 wherein:
said fitting is a cap having a member which at least partially covers the top side of the side section and is joined with a run-in bevel which slopes downwardly into the guide trough.

14. A guide trough as defined in claim 10 wherein:
the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

15. A guide trough as defined in claim 1 wherein:
there are plural cross-members and adjacent cross-members secure a holding member of a fitting between them by an interference fit therebetween.

16. A guide trough as defined in claim 15 wherein:
said fitting has a holding member which protrudes obliquely downward from the fitting and is disposed in engagement with a cross-member.

17. A guide trough as defined in claim 15 wherein:
said fitting is a slide rail having a support surface for the energy management chain and having a projection which extends vertically upwards from the support surface and located adjacent the side section for engagement by the energy management chain.

18. A guide trough as defined in claim 15 wherein:
said fitting is a cap having a member which at least partially covers the top side of the side section and is joined with a run-in bevel which slope downwardly into the guide trough.

19. A guide trough as defined in claim 15 wherein:
the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

20. A guide trough as defined in claim 1 wherein:
the cross-members have a slope in the range of forty-five degrees to seventy degrees.

21. A guide trough as defined in claim 20 wherein:
said fitting has a holding member which protrudes obliquely downward from the fitting and is disposed in engagement with a cross-member.

22. A guide trough as defined in claim 20 wherein:
said fitting is a slide rail having a support surface for the energy management chain and having a projection which extends vertically upwards from the support surface and located adjacent the side section for engagement by the energy management chain.

23. A guide trough as defined in claim 20 wherein:

said fitting is a cap having a member which at least partially covers the top side of the side section and is joined with a run-in bevel which slope downwardly into the guide trough.

24. A guide trough as defined in claim 20 wherein:

the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

25. A guide trough as defined in claim 1 wherein:

the side sections are hollow.

26. A guide trough as defined in claim 25 wherein:

said fitting has a holding member which protrudes obliquely downward from the fitting and is disposed in engagement with a cross-member.

27. A guide trough as defined in claim 25 wherein:

said fitting is a slide rail having a support surface for the energy management chain and having a projection which extends vertically upwards from the support surface and located adjacent the side section for engagement by the energy management chain.

28. A guide trough as defined in claim 25 wherein:

said fitting is a cap having a member which at least partially covers the top side of the side section and is joined with a run-in bevel which slopes downwardly into the guide trough.

29. A guide trough as defined in claim 25 wherein:

the fitting is a wall guard for the lower strand of the energy management chain, said wall guard having a vertical leg disposed adjacent the side section for emgagement by the energy management chain and having a horizontal leg joined therewith for engagement with the bottom of the lower strand of the energy management chain.

30. A guide trough as defined in claim 1 wherein:

said fitting has a holding member which protrudes obliquely downward from the fitting and is disposed in engagement with a cross-member.

* * * * *